(No Model.) 6 Sheets—Sheet 1.

R. H. FOWLER, T. BENSTEAD, J. OGLEBY. & H. EVERSHED.
APPARATUS FOR STEAM CULTIVATION.

No. 534,216. Patented Feb. 12, 1895.

Fig. 1.

Witnesses:
G. W. Rea.
Thos. A. Green.

Inventors:
Robert H. Fowler,
Thomas Benstead,
John Ogleby and
Harry Evershed,
By James L. Norris.
Atty.

(No Model.) 6 Sheets—Sheet 2.
R. H. FOWLER, T. BENSTEAD, J. OGLEBY, & H. EVERSHED.
APPARATUS FOR STEAM CULTIVATION.
No. 534,216. Patented Feb. 12, 1895.
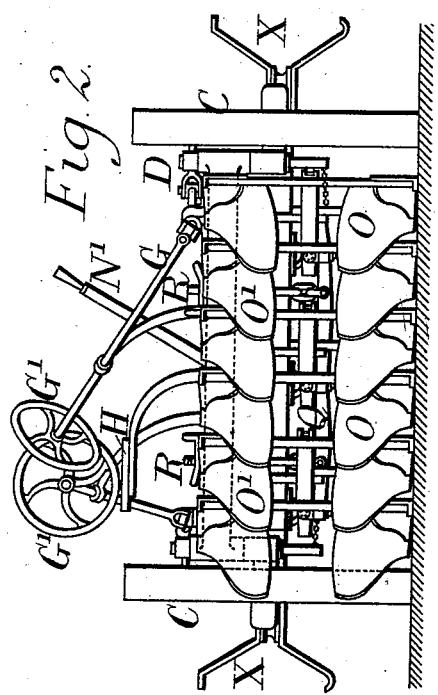
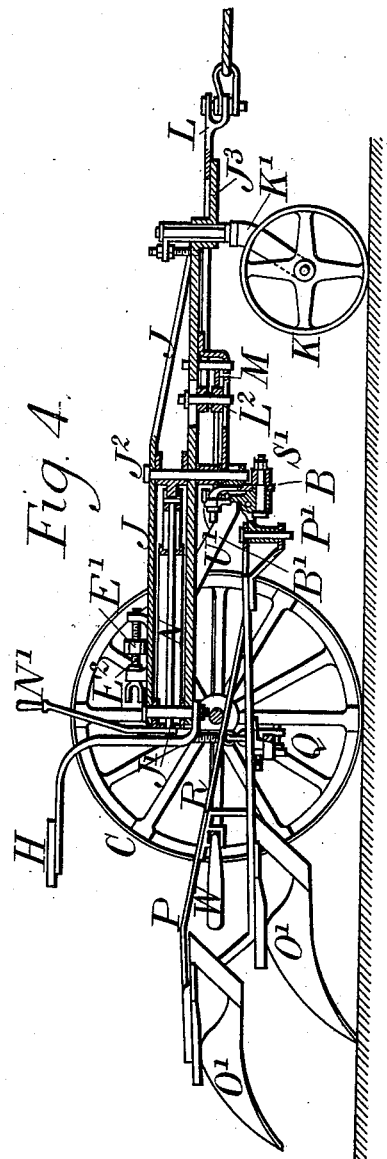

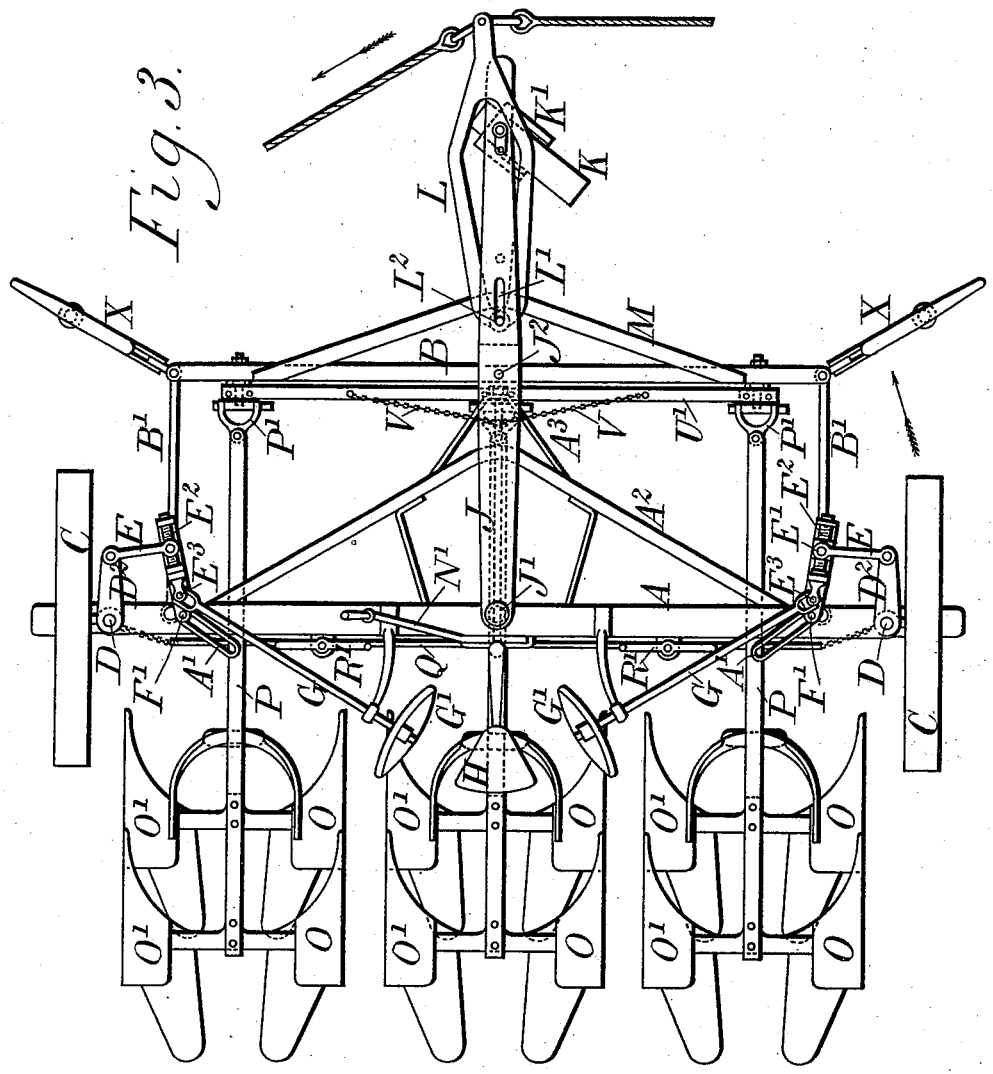

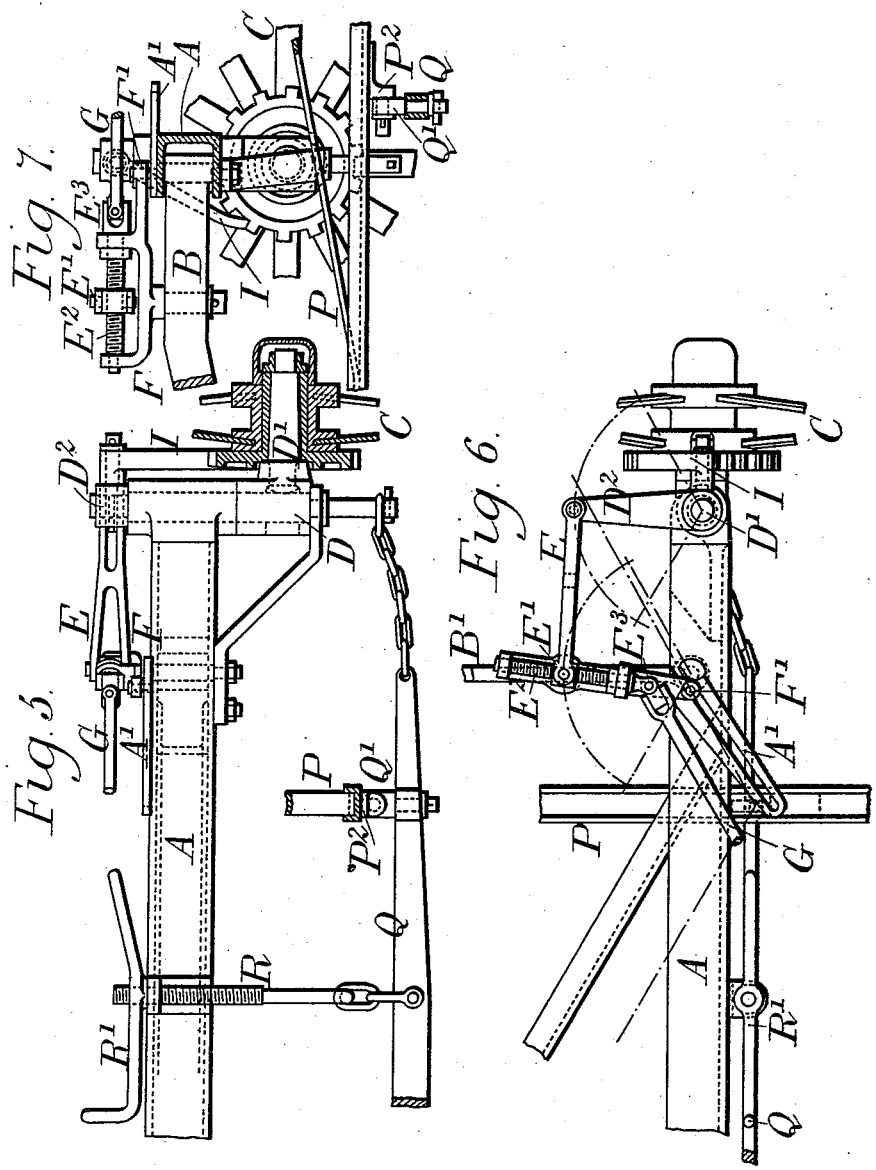

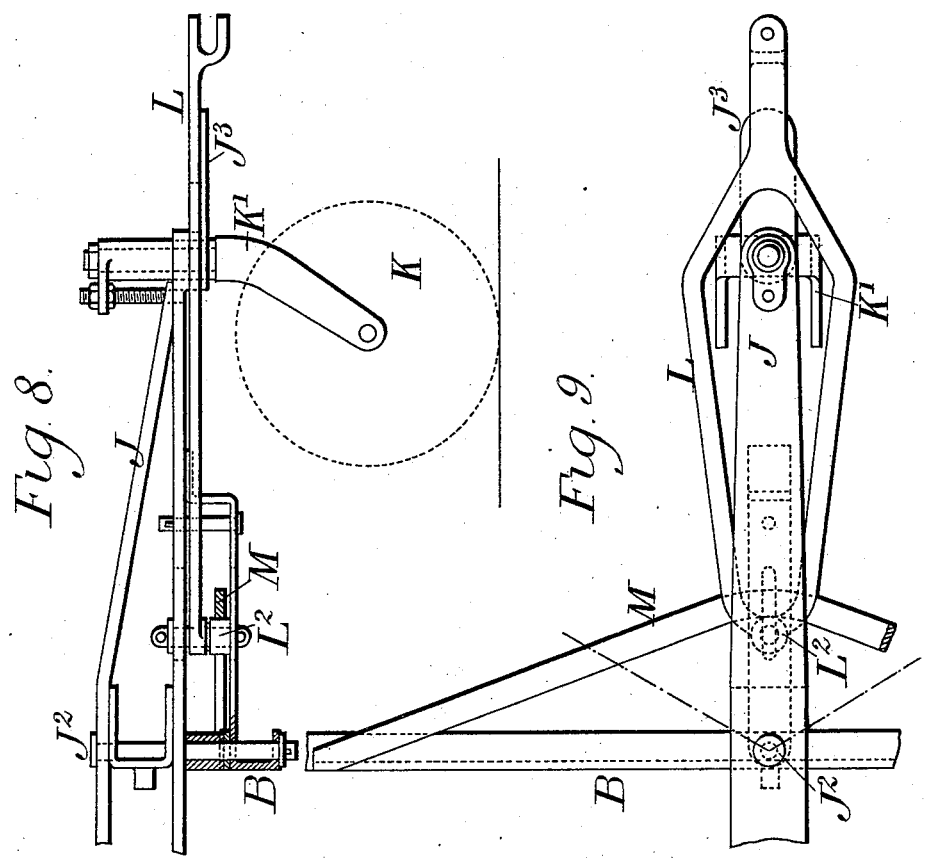

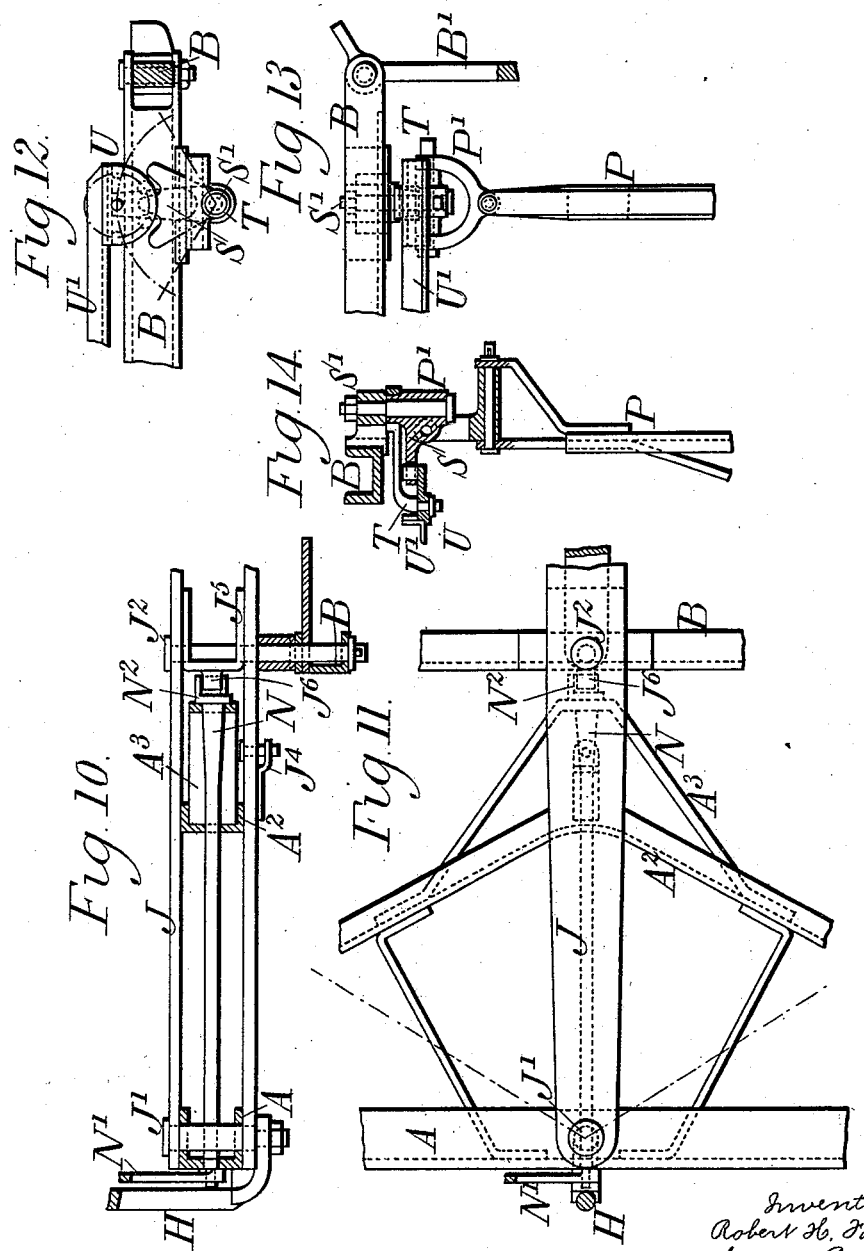

UNITED STATES PATENT OFFICE.

ROBERT H. FOWLER, THOMAS BENSTEAD, JOHN OGLEBY, AND HARRY EVERSHED, OF LEEDS, ENGLAND.

APPARATUS FOR STEAM CULTIVATION.

SPECIFICATION forming part of Letters Patent No. 534,216, dated February 12, 1895.

Application filed April 3, 1894. Serial No. 506,216. (No model.) Patented in England June 19, 1893, No. 12,035, and in Canada June 6, 1894, No. 46,277.

*To all whom it may concern:*

Be it known that we, ROBERT HENRY FOWLER, THOMAS BENSTEAD, JOHN OGLEBY, and HARRY EVERSHED, citizens of England, all residing at The Steam Plough Works, Leeds, in the county of York, England, have invented certain new and useful Improved Apparatus for Steam Cultivation, (for which we have obtained Letters Patent in Great Britain, dated June 19, 1893, No. 12,035, and in Canada, dated June 6, 1894, No. 46,277,) of which the following is a specification.

This invention relates more particularly to a construction of apparatus for steam cultivation described in the specification to Patent No. 463,502, dated November 17, 1891, wherein the main frame supported by the traveling wheels carried an articulated framing with the cultivating tools which was constructed so as to constitute a parallel motion that could be made to assume any desired angular position for determining the position of the cultivating tools, these parts being so arranged relatively to the traction rope that on changing the direction of traction the whole apparatus was turned around one of the end wheels as a pivot while the cultivating tools were automatically put in position for reverse action in fresh soil.

According to the present improved construction, the main frame is so mounted upon its traveling wheels that these can be adjusted in position independently of each other for effecting the steering of the apparatus, and there are provided two sets of cultivating tools capable of turning on axes, so that as the framing is turned round, such axes are automatically turned so as to raise the one set of tools from out of the soil and to lower the other set on to the soil. For these purposes the apparatus is constructed as we will describe with reference to the accompanying drawings, in which—

Figure 1 shows a plan of the machine in the position for plowing. Fig. 2 shows a back elevation of the same. Fig. 3 shows a plan of the machine in the act of turning with the shares raised off the soil, after having completed one set of furrows. Fig. 4 shows a longitudinal section corresponding to Fig. 3. Figs. 5, 6 and 7 show respectively a front view, plan and cross section to an enlarged scale of part of the framing, showing the appliances for steering, and for raising the plows off the ground. Figs. 8 and 9 show a sectional side view and plan of the front part of the framing, hauling lever and caster roller. Figs. 10 and 11 show a sectional side view and plan of the parts immediately behind the parts shown at Figs. 8 and 9; and Figs. 12, 13 and 14 show a front view, plan and cross section of the gear for turning the cultivating tools.

The main frame A supports an articulated framing B B' carrying the cultivating tools, and which is constructed as a parallel motion in a somewhat similar manner to that described in the specification to Patent No. 9,299 of 1890, but instead of the steering gear for the traveling wheels C being arranged as there described the perch pins D on which their axles D' are fixed, carry at their upper ends a crank arm $D^2$ that is connected by a link E to a screw nut E' on a screw spindle $E^2$ carried in a bracket F that can swivel partially on the framing B' but which is controlled in its motion by working with a stud F' in a slotted plate A' fixed on the main framing A.

To the screw spindle $E^2$ is connected by means of a universal joint at $E^3$ a steering spindle G that extends to near the driver's seat H, where it is provided with a hand wheel G', so that the driver in turning the spindle G will cause the nut E' to travel along the screw spindle $E^2$ in one direction or the other, thereby turning the perch pin D so as to bring the traveling wheel C into any desired angular position relatively to the framing for the purpose of steering the machine when traveling. The wheels C also have their positions adjusted automatically by the action of the bracket F and slotted plate A', according to whether the machine is in the position for plowing as at Fig. 1, or is turning round from one position to the other as at Fig. 3, the bracket being turned on its swivel during such change of position, by the sliding of the pin F' in the slot of A'.

As described in the former patent the wheels C have fixed on their naves ratchets with which engage pawls I, Fig. 5, on the perch pins, so as to prevent the wheels from turning in the backward direction.

From the middle of the main frame A projects a horizontal arm J, pivoted to the frame A at J' and at J² to the front bar B of the parallel motion frame and it is supported at its front end by a caster wheel K which adjusts itself automatically to the direction of motion due to the pull of the traction rope connected to the hauling lever L, as shown at Figs. 1, 3 and 4.

The lever L is formed with a wide loop so that the caster bracket K' fixed to the end of the arm J, can pass down through lever L, as shown. The lever L is supported at its front end by a plate J³ fixed to arm J and has a slotted connection with the arm J at L' where it is provided with a roller L² that bears upon the inner edge of an angularly bent bar M fixed to the front bar B of the parallel motion framing, so that when a pull is exerted at an angle by the traction rope upon the hauling lever L this acts upon the arm J and upon the bar M so as to draw the machine round on its one running wheel, acting as a pivot, and to cause the parallel motion frame, and consequently the cultivating tool to eventually assume the requisite angular position for plowing, as shown at Fig. 1, the caster wheel being automatically turned into the oblique position shown at Fig. 3 to facilitate such turning.

It will be seen that the entire pull of the traction rope is taken by the roller L² of the hauling lever L bearing against the angular bar M. Thus, when the machine is in the position for plowing as at Fig. 1, the bar M being in the oblique position shown relatively to the lever L and its roller L², it will offer effective resistance to any change in the angular position of the machine, such as would be liable to occur without this device if the arm J were only pivoted to the middle of the frame A, and the forward left hand wheel (Fig. 1) of the machine were to meet with a considerable obstacle when traveling.

It will be seen that to insure the proper turning of the machine it is necessary that during the greater part of such motion the machine should be maintained in the "square" position shown at Fig. 3. For this purpose the angular part A² of the frame A carries an angular bracket A³ which carries a spindle N passing back to the driver's seat where it has a hand lever N' fixed to it by which it can be turned partly round. At its front end it carries a semi-cylindrical socket N² which, by turning the spindle N half round can be brought either into the position shown at Figs. 10 and 11, or into the diametrically opposite position.

On a distance piece J⁵ of the arm J is fixed a stud J⁶ which, when the socket N² is in the position shown, will butt against it when a pull is being exerted on the arm J in the direction of the arrow, Fig. 3, and thus the arm J is prevented from moving beyond that position and the frame is consequently kept square while the machine is being turned round to the left, as at Fig. 3.

When it is required that the frame shall assume the angular position Fig. 1, the spindle N is turned half round so that the stud J⁶ is no longer retained by its socket N². The angular pull of the rope will then move the arm J and frame B B' over into the angular position. The opposite action takes place when the machine requires to be turned round to the right hand.

The shares or cultivating tools O O O' O' are arranged in sets of four, namely two upper and two lower ones, all attached to one and the same horizontal framed arm P which arms are carried by a bar Q that is suspended by screw spindles R from the frame A, so that when the machine is not in operation the shares can be raised up off the soil by raising the bar Q in turning the nuts R' of the screw spindles.

The front end of each framed arm P is connected by a universal joint P' to a toothed segment S free to turn on a pin S' on the front parallel motion bar B. The arm is also pivoted by means of a lug P² to an eye Q' on the bar Q (Fig. 7) so that it will be seen that the arm P is free to turn at S' and Q' so as to bring either the pair of tools O O, or the pair O' O' on to the soil, or it can be brought into the intermediate position shown at Figs. 3 and 4, in which neither pair is on the soil. It will be seen that the one tool of each pair is fixed so far away from and in advance of the other one on the arm P, that when they are all brought into the position at Fig. 1, the entire set of tools is situated at equal distances apart in an oblique line parallel with the position of the framing.

The rotation of the arms P for raising the one set of tools off the soil and lowering the other set on to the soil on turning the machine round at the end of a set of furrows, is effected partly automatically by the action of the soil on the tools engaged therewith, and partly by the following device: On the pins S' of the front bar B are mounted cranks or radius arms T the upper ends of which are pivoted to toothed segments U engaging with the toothed segments S, the segments U being fixed to a bar U' running parallel with the bar B.

The arm J has an eye J⁴ (Fig. 10) on its under side which is attached by two chains V V to eyes on the bar U', both chains having a certain amount of slack in them when the arm J and bar U' are in the middle position shown at Fig. 3.

When the machine after completing a set of furrows begins to turn round for commencing the next set, the shares will first begin to turn automatically owing to the action of the soil thereon when bringing the framing and arm J from the oblique into the square position shown at Figs. 3 and 4 and they will continue in that position until the turning has nearly been completed, when, on the arm J being released by the turning of the socket $N^2$ as before described, its angular motion round its pivot J' will cause the eye $J^4$ to move laterally relatively to the pivot $J^2$ on the bar B, so that the arm will thereby first pull the left hand chain V (Fig. 1) taut, and will then by means of such chain pull at the bar U', so as to shift it longitudinally and thereby cause the toothed segments V to turn the segments S and thus to rotate the arms P so as to bring the shares O O onto the soil as indicated at Fig. 1.

W W are skids attached to the framed arms P between each pair of shares or cultivating tools and arranged to slide on the surface of the soil when the shares are embedded to the requisite extent so as to prevent their further penetration. X X are brackets pivoted to the frame B B' and having guide rollers for the hauling ropes.

Having thus described the nature of our invention and the best means we know for carrying the same into practical effect, we claim—

1. In an apparatus for steam cultivation, the combination with a frame and perch pins carrying the axles of the traveling wheels, of steering gear consisting of cranks E connected to nuts E' on screw spindles $E^2$ carried by swiveling brackets F engaged by pins F' with slots A' on the main frame A, said screw spindles being connected by universal joints to steering spindles G whereby the traveling wheels can be adjusted to any angular position for steering and are also automatically brought into either of the requisite positions for traveling with the frame in the square or in the oblique position, substantially as described.

2. In apparatus for steam cultivation, the combination with a main frame A, and a front bar B, of an angular bar M fixed to said front bar, an arm J pivoted to the frame A and bar B, and a hauling lever L connected to the arm J by a slotted pivot, and a roller carried by said lever and bearing against the angular bar M, substantially as described.

3. In an apparatus for steam cultivation, the combination with a caster arm J of a stud $J^6$ fixed thereon and a semicylindrical rotatable socket $N^2$ carried by the main frame, whereby the caster arm is retained in the middle or square position during the operation of turning, substantially as described.

4. In apparatus for steam cultivation, the combination with the arms P carrying two sets of tools O O O' O' with toothed segments S gearing with other toothed segments U fixed on a bar U' carried by radius arms T and connected with the caster arm J by chains or equivalent means whereby on the moving of the parallel motion frame from the one oblique position to the opposite one, the toothed segments U are made to turn the arms P so as to raise the one set of plows from the soil and to lower the other set onto the soil, substantially as described.

In testimony whereof we have signed our names to this specification, in presence of two subscribing witnesses, this 14th day of March, A. D. 1894.

ROBERT H. FOWLER.
THOMAS BENSTEAD.
JOHN OGLEBY.
HARRY EVERSHED.

Witnesses:
 EDWD. WHITELEY,
 JOSH. HY. WHITAKER,
  *Solicitor's Clerks, Leeds.*